US010988127B2

(12) United States Patent
Kim

(10) Patent No.: US 10,988,127 B2
(45) Date of Patent: Apr. 27, 2021

(54) BRAKE DEVICE FOR VEHICLE AND METHOD FOR CONTROLLING THE SAME

(71) Applicants: HYUNDAI MOTOR COMPANY, Seoul (KR); KIA MOTORS CORPORATION, Seoul (KR)

(72) Inventor: Tae Heon Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 54 days.

(21) Appl. No.: 16/199,771

(22) Filed: Nov. 26, 2018

(65) Prior Publication Data

US 2020/0114893 A1 Apr. 16, 2020

(30) Foreign Application Priority Data

Oct. 15, 2018 (KR) .......................... 10-2018-0122246

(51) Int. Cl.
| | |
|---|---|
| *B60T 13/68* | (2006.01) |
| *B60T 13/74* | (2006.01) |
| *B60T 7/04* | (2006.01) |
| *B60T 13/66* | (2006.01) |
| *B60T 13/16* | (2006.01) |

(52) U.S. Cl.
CPC ............ *B60T 13/686* (2013.01); *B60T 7/042* (2013.01); *B60T 13/165* (2013.01); *B60T 13/662* (2013.01); *B60T 13/745* (2013.01); *B60T 2270/402* (2013.01); *B60T 2270/414* (2013.01); *B60T 2270/415* (2013.01)

(58) Field of Classification Search
CPC .... B60T 13/686; B60T 13/745; B60T 13/662; B60T 13/165; B60T 7/042; B60T 2270/415; B60T 2270/414; B60T 2270/402
USPC ............................................ 303/119.1–119.3
See application file for complete search history.

(56) References Cited

U.S. PATENT DOCUMENTS 9,783,177 B2 * 10/2017 Lee ........................ B60T 13/686
9,944,262 B2 * 4/2018 Kim ........................ B60T 7/042
10,040,438 B2 * 8/2018 Lim ...................... B60T 13/146
(Continued)

FOREIGN PATENT DOCUMENTS

JP 2012-240452 A 12/2012
KR 10-2014-0057888 A 5/2014
(Continued)

*Primary Examiner* — Xuan Lan Nguyen
(74) *Attorney, Agent, or Firm* — Morgan, Lewis & Bockius LLP

(57) ABSTRACT

The present disclosure relates to a brake device for a vehicle, and a main object of the present disclosure is to provide a brake device for a vehicle which can stably perform an electric parking braking cooperative control process for dynamic parking braking in a state in which the brake device enters a backup mode due to an abnormality or a malfunction generated in a device related to an electric booster in a vehicle equipped the electric booster. In order to achieve the above object, a brake device including a fallback valve which is provided on a hydraulic pressure supply line connected to a wheel brake of a wheel on which an electronic parking brake is installed, and which is configured to selectively shut off brake liquid pressure supplied to the wheel brake, and a method for controlling the same are disclosed.

10 Claims, 4 Drawing Sheets

(56) References Cited

U.S. PATENT DOCUMENTS

| | | | | |
|---|---|---|---|---|
| 10,071,717 B2* | 9/2018 | Kim | ............... | B60T 13/745 |
| 10,077,036 B2* | 9/2018 | Kim | ............... | B60T 13/745 |
| 10,093,295 B2* | 10/2018 | Kim | ............... | B60T 11/22 |
| 10,583,819 B2* | 3/2020 | Kim | ............... | B60T 7/042 |
| 2017/0106843 A1* | 4/2017 | Jeong | ............... | B60T 11/232 |
| 2017/0144643 A1* | 5/2017 | Kim | ............... | B60T 13/745 |
| 2017/0144644 A1* | 5/2017 | Kim | ............... | B60T 8/4081 |
| 2017/0334417 A1* | 11/2017 | Choi | ............... | B60T 8/442 |
| 2018/0099652 A1* | 4/2018 | Jung | ............... | B60T 8/4081 |
| 2018/0111593 A1* | 4/2018 | Kim | ............... | B60T 8/17 |

FOREIGN PATENT DOCUMENTS

| | | |
|---|---|---|
| KR | 10-2015-0106597 A | 9/2015 |
| KR | 10-1673772 B1 | 11/2016 |
| WO | 2006-046273 A1 | 5/2006 |

\* cited by examiner

[FIG. 1]   --PRIOR ART--
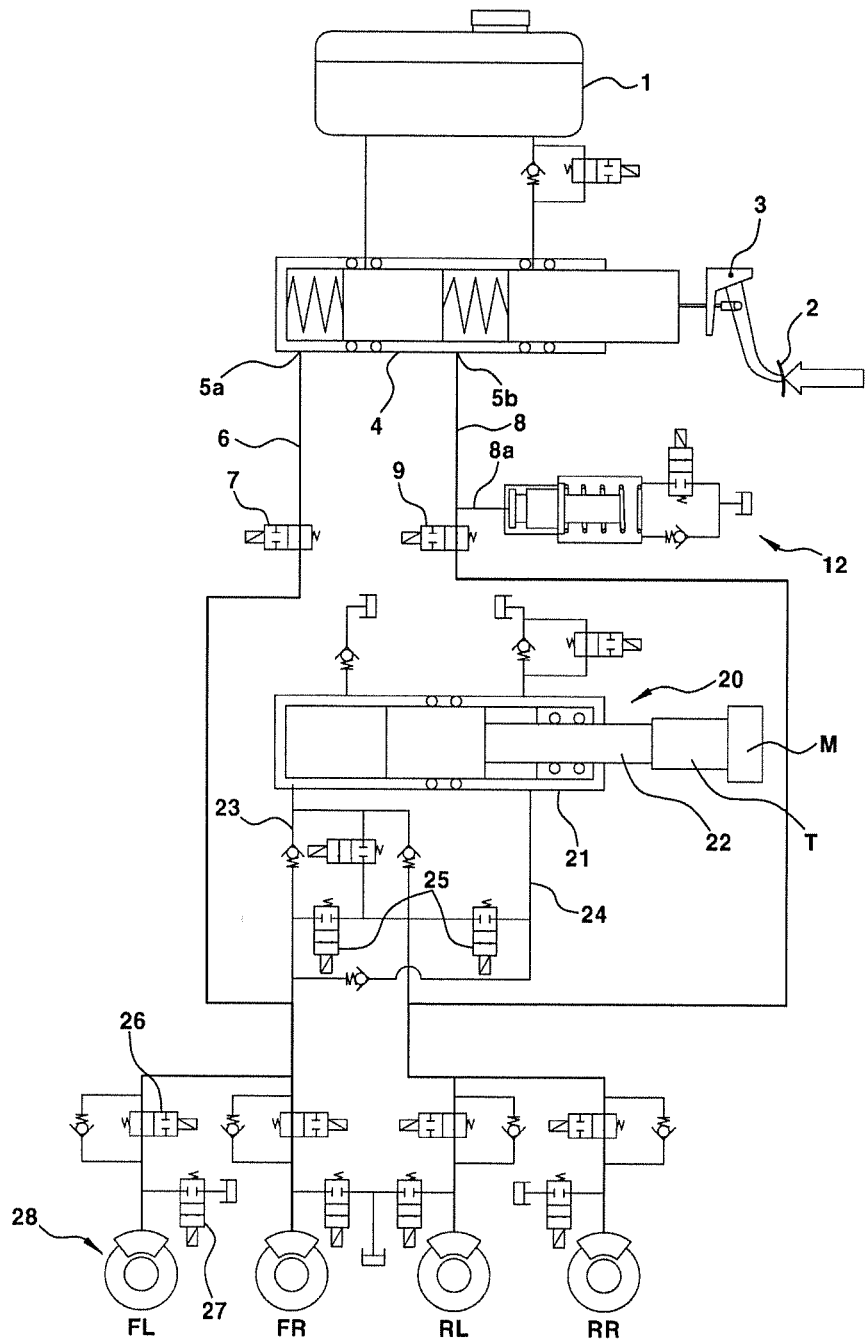

[FIG. 2]
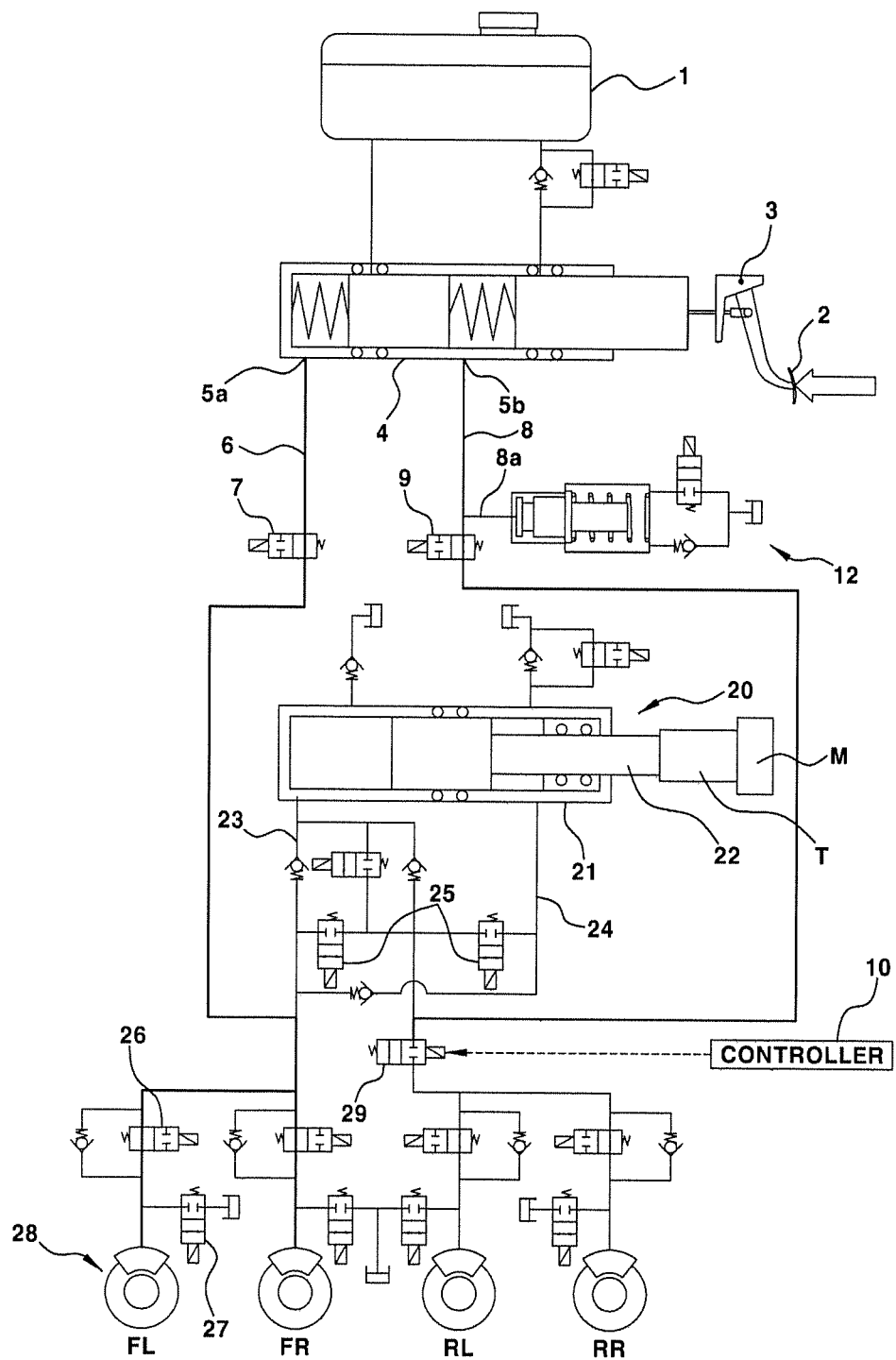

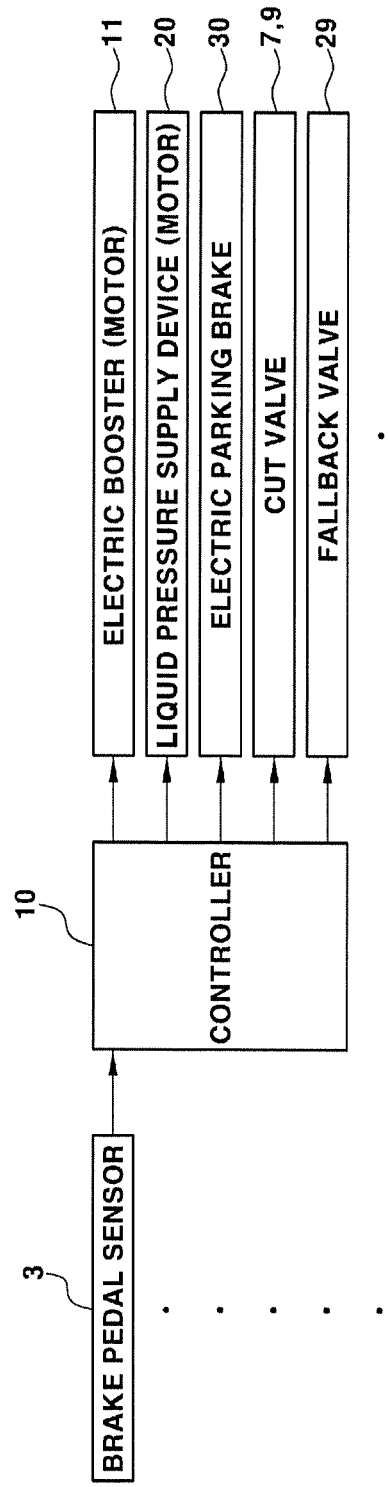

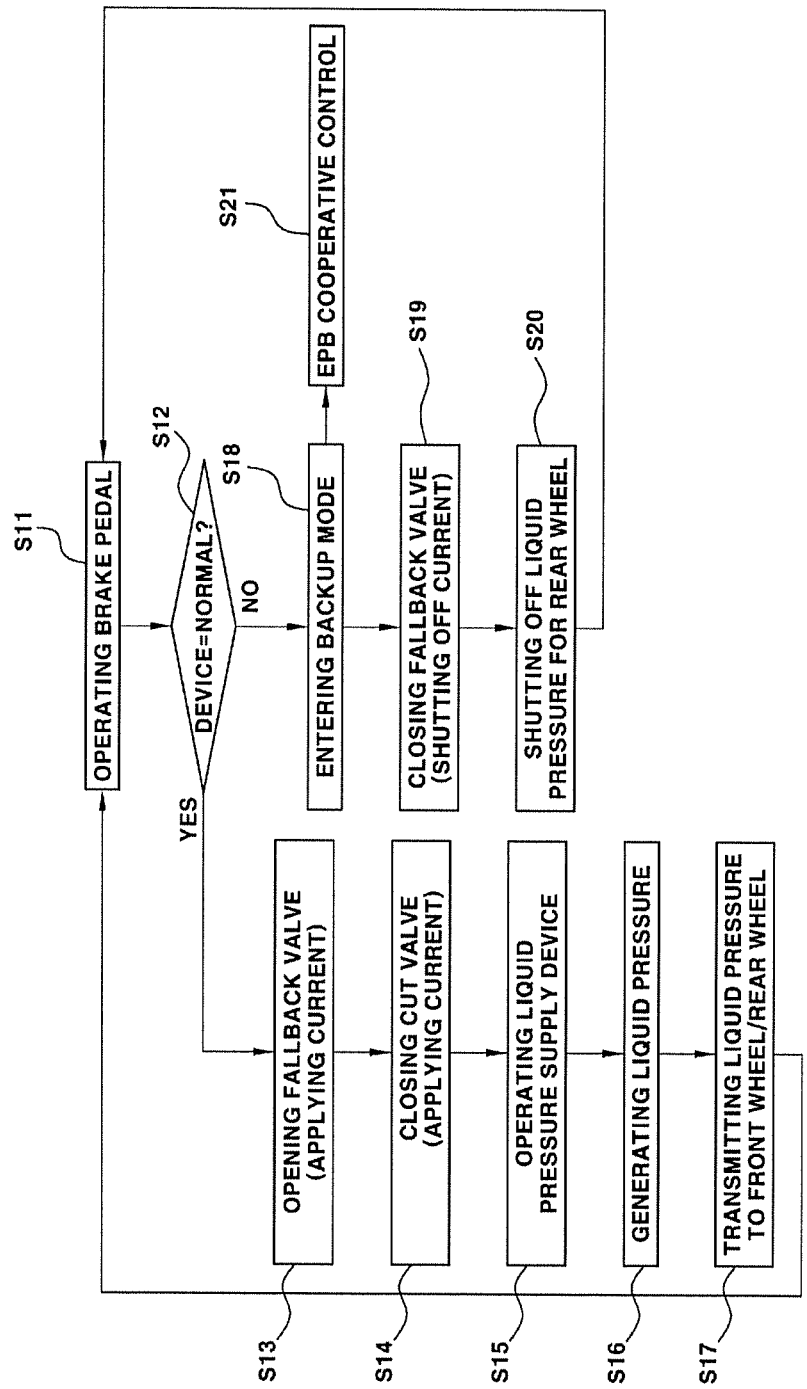
[FIG. 4]

BRAKE DEVICE FOR VEHICLE AND METHOD FOR CONTROLLING THE SAME

CROSS-REFERENCE TO RELATED APPLICATION

This application claims the benefit of priority to Korean Patent Application No. 10-2018-0122246 filed on Oct. 15, 2018 with the Korean Intellectual Property Office, the entire contents of which are incorporated herein by reference.

TECHNICAL FIELD

The present disclosure relates to a brake device for a vehicle and a method for controlling the same, and more particularly, to a brake device for a vehicle which can stably perform an electric parking braking cooperative control process for dynamic parking braking in a state in which the brake device enters a backup mode due to an abnormality or a malfunction generated in a device related to an electric booster in a vehicle equipped the electric booster, and a method for controlling the same.

BACKGROUND

Generally, a brake device for a vehicle includes a boosting device, that is, a brake booster installed between a brake pedal and a master cylinder, and the brake booster increases pedal operational force (i.e., pedaling force) which is a force applied to a brake pedal by a driver, and transmits it to the master cylinder.

Commonly, the brake booster is configured to increase the brake pedal operational force by using difference in air pressure between vacuum pressure (negative pressure) and atmospheric pressure provided on an intake side of an engine, and the master cylinder is coupled to a forward cell forming a constant pressure chamber to enable hydraulic pressure to be generated by using increased force.

The above brake booster includes an input rod that receives force from the brake pedal and an output rod that outputs increased force, and the brake booster transmits output greater than the input, that is, force applied to the brake pedal, to the master cylinder through the output rod when the driver presses the brake pedal to allow the hydraulic pressure to be smoothly generated in the master cylinder.

Therefore, the brake booster reduces force required when the driver operates the brake pedal.

Meanwhile, an integrated electric booster (IEB) that uses an electric motor as a boosting force source has been known in the break booster for reducing force required when the brake pedal is operated.

Such the integrated electric booster is an electric device that utilizes force of an electric motor other than mechanical engine negative pressure to increase the force, when a controller controls operation of the electric motor based on an operational amount of the brake pedal detected by a sensor, a piston is moved forward by a rotational motion of the electric motor to enable necessary hydraulic pressure to be generated in the master cylinder.

Since the electric booster does not need to utilize the negative pressure of the engine as described above, there is an advantage that the integrated electric booster can be applied to an environmentally friendly vehicle such as an electric vehicle which is not equipped with an engine. However, since the electric booster is an electric system other than a mechanical type device, there is a high possibility that the electric booster is switched to a backup mode due to electric influences such as a low voltage or a circuit burnout.

However, when the actual backup mode occurs, braking assist force is required due to a sudden drop in the braking deceleration.

In the backup mode, a collision accident may occur due to lack of braking force. In addition, even when the brake device enters the backup mode after a malfunction is detected, since it is only necessary to satisfy a certain level of regulatory specifications, it is possible to satisfy the actual regulations under the malfunction condition. However, when operating the brake pedal, the driver may actually feel that pedal operation is stiff at the beginning and simultaneously feel as if braking deceleration of the vehicle is hardly formed.

Accordingly, as a solution to the above problem, a method of assisting braking deceleration by using an electronic parking brake (hereinafter, referred to as "EPB") of a rear wheel when the electric booster is switched into the backup mode in a vehicle equipped with the integrated electric booster may be considered.

That is, this method assists the braking deceleration of the vehicle in the backup mode when a vehicle is in running state, not in parking by utilizing dynamic parking brake technology, which is an additional function of an EPB caliper of the rear wheel.

In a vehicle equipped with the conventional integrated electric booster, however, it is extremely difficult to perform cooperative control assisting the braking deceleration by using the dynamic parking braking of the actual EPB in the backup mode.

Since a cut valve, which is a normal open (NO) type valve, is in an open state in the backup mode, when the driver presses the brake pedal in this state, liquid pressure caused by a pedaling force is also transmitted to the caliper of the rear wheel. Accordingly, in an internal state of the caliper of the rear wheel in which the liquid pressure is already formed as described above, it is difficult to perform EPB cooperative control, that is, the dynamic parking braking control.

In a state in which the liquid pressure of the master cylinder caused by the driver's pedaling force is being transmitted to the caliper of the rear wheel, when the EPB cooperative control for generating the braking force in the EPB, that is, the cooperative control allowing an EPB actuator to exert separate force on the caliper of the rear wheel caliper is performed, a rear wheel lock phenomenon may occur, and due to this phenomenon, the vehicle may lose stability and turn around.

For this reason, it is practically extremely difficult to perform the EPB cooperative control for the dynamic parking braking in the backup mode in the conventional brake device to which the integrated electric booster is applied.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with prior art.

Accordingly, the present disclosure is devised to solve the above describe problems, and an object of the present disclosure is to provide a brake device which can stably perform an electric parking braking cooperative control process for dynamic parking braking in a state in which the brake device enters a backup mode due to an abnormality or a malfunction, such as low voltage or circuit burnout or the like, generated in a device related to an electric booster, and a method for controlling the same.

In order to achieve the above object, according to one aspect of the present disclosure, the brake device for a vehicle provided with an electric booster and an electronic parking brake, may include a master cylinder configured to receive pedaling force outputted from the electric booster and generate brake liquid pressure; a liquid pressure supply device configured to generate the brake liquid pressure according to a driver's pedal-operational value detected by a brake pedal sensor and supply the brake liquid pressure to a wheel brake of each wheel; a hydraulic pressure supply line connected from the liquid pressure supply device to the wheel brake of each wheel to enable the brake liquid pressure to be supplied from the liquid pressure supply device to the wheel brake; a backup line connected from the master cylinder to the hydraulic pressure supply line to enable the brake liquid pressure to be supplied from the master cylinder to the hydraulic pressure supply line; a cut valve disposed on the backup line and configured to selectively shut off the brake liquid pressure; and a fallback valve disposed on the hydraulic pressure supply line connected to the wheel brake of the wheel on which the electronic parking brake is installed, the fallback valve being configured to selectively shut off the brake liquid pressure supplied to the wheel brake.

In addition, according to another aspect of the present disclosure, the method for controlling the brake device for a vehicle provided with an electric booster and an electronic parking brake and including a master cylinder configured to receive pedaling force outputted from the electric booster and generate brake liquid pressure; a liquid pressure supply device configured to generate the brake liquid pressure according to a driver's pedal-operational value detected by a brake pedal sensor and supply the brake liquid pressure to a wheel brake of each wheel; a hydraulic pressure supply line connected from the liquid pressure supply device to the wheel brake of each wheel to enable the brake liquid pressure to be supplied from the liquid pressure supply device to the wheel brake; a backup line connected from the master cylinder to the hydraulic pressure supply line to enable the brake liquid pressure to be supplied from the master cylinder to the hydraulic pressure supply line; a cut valve disposed on the backup line and configured to selectively shut off the brake liquid pressure; and a fallback valve disposed on the hydraulic pressure supply line connected to the wheel brake of the wheel on which the electronic parking brake is installed, the fallback valve being configured to selectively shut off the brake liquid pressure supplied to the wheel brake, may include the steps of diagnosing a state of the brake device including the electric booster by a controller, and allowing the brake device to enter a backup mode by the controller in a case where the brake device is in a malfunction state when a driver operates a brake pedal; generating the brake liquid pressure in the master cylinder according to the pedaling force as a driver operates a brake pedal; controlling, by the controller, the fallback valve in the backup mode to become in a closed state; and performing, by the controller, dynamic parking brake control in which braking force for vehicle deceleration is generated by using the electronic parking brake.

Furthermore, according to further another aspect of the present disclosure, the method for controlling the brake device for a vehicle provided with an electric booster, an electronic parking brake installed on a rear wheel, a fallback installed on a hydraulic line between a master cylinder and a wheel brake of the rear wheel in addition to a cut valve, may include the steps of diagnosing a state of the brake device including the electric booster by a controller, and allowing the brake device to enter a backup mode by the controller in a case where the brake device is in a malfunction state when a driver operates a brake pedal; generating the brake liquid pressure in the master cylinder according to the pedaling force as a driver operates a brake pedal; controlling, by the controller, the fall back valve in the backup mode to become in a closed state; and performing, by the controller, dynamic parking brake control in which braking force for vehicle deceleration is generated by using the electronic parking brake.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein:

FIG. 1 is a structural view illustrating a brake device for a vehicle according to the prior art;

FIG. 2 is a configuration view illustrating a brake device for a vehicle according to an embodiment of the present disclosure;

FIG. 3 is a block diagram illustrating primary components in the brake device for a vehicle according to an embodiment of the present disclosure; and FIG. 4 is a flow chart showing a process for controlling the brake device for a vehicle according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, embodiments of the present disclosure will be described in detail with reference to the accompanying drawings so that those skilled in the art to which the present disclosure pertains can easily carry out the present disclosure. However, the present disclosure is not limited to the embodiments described herein, but may be embodied in other forms.

In the whole description, when a component is referred to as being "comprising" any component, it does not exclude other components, but means that this component further comprises the other components unless otherwise specified.

In order to aid to understand the present disclosure, the construction and the problems of the conventional brake device are described first with reference to the drawings.

FIG. 1 is a structural view illustrating a brake device for a vehicle according to the prior art, and illustrates a hydraulic circuit in which a brake liquid pressure is generated as a driver operates a brake pedal 2. In the hydraulic circuit, hydraulic lines 6 and 8 to which hydraulic pressure is supplied are indicated by thick lines.

FIG. 1 illustrates a state in which the brake liquid pressure caused by pedaling force of the brake pedal 2 is transmitted to all of wheel brakes 28 of front wheels FL and FR and wheel brakes 28 of rear wheels RL and RR in a backup mode. In this state, dynamic parking braking control becomes substantially unavailable.

As illustrated, the brake device includes a reservoir 1 in which brake liquid is stored, a master cylinder 4 generating the liquid pressure when the driver operates the brake pedal 2, a pedal simulator 12 configured to provide the pedal feel according to the driver's pedaling force by the liquid pressure generated in the master cylinder 4, the wheel brakes 28 provided on the wheels FL, FR and RL, RR, respectively, a liquid pressure supply device 20 configured to generate the brake liquid pressure (braking hydraulic pressure), hydraulic lines 6, 8, 8a, 23, 24 connecting the components including the reservoir 1, the master cylinder 4, the pedal simulator 12, the liquid pressure supply device 20, the wheel brakes 28 and the like, and valves 7, 9, 25, 26 and 27 provided on the hydraulic lines.

In FIG. 1, reference numeral 3 denotes a pedal travel sensor (PTS), reference numerals 5a and 5b denote hydraulic ports through which the hydraulic pressure is discharged from the master cylinder 4, reference numeral 21 denotes a hydraulic cylinder of the hydraulic pressure supply device 20, and reference numeral 22 denotes a piston of the hydraulic pressure supply device 20.

In addition, in FIG. 1, reference symbol M denotes a motor of the hydraulic pressure supply device 20, and reference symbol T denotes a power conversion part of the hydraulic pressure supply device 20.

Referring to FIG. 1, in the conventional brake device, since the cut valves 7 and 9 are in opened state when the brake device enters the backup mode, the brake liquid pressure (hydraulic pressure of the master cylinder) caused by the pedaling force may be applied to all of calipers (wheel cylinders) of the wheel brakes 28, which are provided on the front wheels FL and FR and the rear wheels RL and RR, through the hydraulic lines 6 and 8.

In a vehicle equipped with an electric booster (not shown), for example a known integrated electric booster (IEB), when it is not possible to utilize the electric booster due to an abnormality or malfunction, such as low voltage or circuit burnout or the like, generated in the device, once the brake device enters the backup mode, no power is applied to all the valves in the conventional brake device as illustrated.

Therefore, the normal open (NO) type cut valves 7 and 9 are opened, and at this time, when the driver presses the brake pedal 2, the brake liquid pressure (hydraulic pressure) generated in the master cylinder 4 by the driver's pedaling force is directly transmitted to the caliper of the wheel brake 28 provided on each of the wheels FL, FR and RL, RR.

At this time, since the brake liquid pressure (hydraulic pressure) generated in the master cylinder 4 by the driver's pedaling force is transmitted to the wheel brakes 28 of the rear wheels RL and RR, more specifically, to the calipers of the rear wheel brakes, it is impossible to accurately and precisely control operation of an electronic parking brake (not shown) (hereinafter, referred to as "EPB") of the rear wheels.

More specifically, in the backup mode, when the driver operates the brake pedal 2 to generate braking force in the rear wheel as well as the front wheel, performing EPB cooperative control (dynamic parking brake control), which precisely controls operation of the EPB of the rear wheels to generate braking force in the rear wheels at a level at which rear wheel lock is not generated, may be considered for stable vehicle braking. However, since the cut valves 7 and 9 are opened in the backup mode, the brake liquid pressure of the master cylinder 4 is directly transmitted to the calipers of the rear wheels RL and RR.

When the brake liquid pressure (i.e., hydraulic pressure in the master cylinder) generated by the driver's pedaling force is created in and applied to the calipers of both the rear wheels RL and RR, since the hydraulic pressure has already been applied to the piston in the cylinder each of the calipers of both the rear wheels, forward and backward control of the piston performed by an EPB actuator cannot be performed properly in this state.

That is, since the brake liquid pressure and force generated by the EPB actuator (usually, an electric motor) (force of the EPB actuator transmitted through a gear device) simultaneously exert on the piston in the cylinder of the caliper, it is difficult to control forward and backward movement of the piston, and in particular, it is difficult to perform EPB cooperative control for controlling operation of the EPB to generate the braking force at a level at which a lock of the rear wheels does not occurs.

In the backup mode, if the hydraulic pressure caused by the driver's pedaling force has been already created in the calipers of both the rear wheels, when the EPB cooperative control for dynamic parking braking is performed, the forward and backward movement of the piston performed by the EPB actuator cannot be precisely controlled to a required level.

Finally, in the worst case, the brake liquid pressure (hydraulic pressure of the master cylinder) caused by the pedaling force of the brake pedal 2 and a braking torque generated by force of the actuator (force of the motor) can instantly reach the level of rear wheel lock, and a vehicle may be turned around due to such the rear wheel lock.

Accordingly, the present disclosure is devised to solve the above problem, and provides a brake device which can stably perform electronic parking brake (hereinafter referred to as "EPB") cooperative control for dynamic parking braking after entering the backup mode in a vehicle equipped with an integrated electric booster (hereinafter referred to as "IEB"), and a hydraulic circuit therefor.

The present disclosure may be applied to a vehicle equipped with the electric booster and the electronic parking brake, and a main technical feature of the present disclosure is that, when the driver presses the brake pedal 2 while the vehicle is running after entering the backup mode, the brake liquid pressure (hydraulic pressure of the master cylinder) to the rear wheels can be shut off by using separate valves to allow EPB cooperative control for dynamic parking braking to be stably performed even in the backup mode.

Generally, when the vehicle equipped with the EPB is running in a normal mode, rather than in the backup mode, the EPB cooperative control (dynamic parking brake control) which precisely controls the EPB may be performed so that, when the driver depresses the brake pedal 2, the braking force, which is required when the vehicle is decelerated, is generated at a level at which the rear wheel lock does not occur.

As described above, a braking for generating the braking force for decelerating the vehicle by using the EPB when the vehicle is in a driving state, rather than in a parking state may be called dynamic parking braking. On the other hand, a braking for the original purpose of fixing the wheels not to allow the vehicle to be moved using the EPB when the vehicle is parked may be referred to as static parking braking.

In the conventional brake device, in the normal mode, the cut valves 7 and 9 may be maintained in closed state by applying a current, and thus it is possible to allow the hydraulic pressure of the master cylinder 4 not to be transmitted to the wheel brakes 28 (calipers) of the rear wheels RL and RR. In addition, in this state, it is possible to perform the EPB cooperative control for the dynamic parking braking.

On the other hand, since, in the backup mode, a current is shut off and the normal open type cut valves 7 and 9 become in open state, the hydraulic pressure of the master cylinder 4 can also be transmitted to the wheel brakes 28 of the rear wheels RL and RR. In a state in which the liquid pressure is already formed in the rear wheel as above, it is difficult to perform the EPB cooperative control for the dynamic parking braking.

In the present disclosure, therefore, in the backup mode, by shutting off the hydraulic pressure to the wheel brakes of the rear wheels using the valve that is an additional component, it is possible to allow the EPB cooperative control for the dynamic parking braking to be stably performed, and it is possible to avoid the risk of collision caused by insufficient braking deceleration in the backup mode through the stable EPB cooperative control.

Hereinafter, a brake device for a vehicle and a method for controlling the same according to an embodiment of the present disclosure will be described in detail with reference to the drawings, and the present disclosure will be described with reference to an embodiment in which an electronic parking brake is mounted on the rear wheels of the vehicle.

FIG. 2 is a configuration view illustrating a brake device for a vehicle according to an embodiment of the present disclosure, and shows a state in which the brake liquid pressure caused by the pedaling force of the brake pedal 2 is not transmitted to the wheel brakes 28 of both the rear wheels RL and RR by the fallback valve 29.

FIG. 3 is a block diagram illustrating primary components in the brake device for a vehicle according to an embodiment of the present disclosure, and FIG. 4 is a flow chart showing a process for controlling the brake device for a vehicle according to an embodiment of the present disclosure.

Although not shown in FIG. 2, the brake device according to an embodiment of the present disclosure may include an integrated electric booster ("IEB") 11 and an electronic parking brake 30 (hereinafter, referred to as "EPB") as shown in FIG. 3.

In addition, the brake device according to an embodiment of the present disclosure further includes an additional valve, that is, the fallback valve 29 which can selectively shut off the liquid pressure for the wheel brakes 28 of the rear wheels RL and RR, and remaining components except for the fallback valve 29 are not different from the corresponding components of the conventional brake device described with reference to FIG. 1.

In other words, the brake device according to an embodiment of the present disclosure may include the reservoir 1 in which the brake liquid (brake oil) is stored, the master cylinder 4 configured to receive the driver's pedaling force which is increased in and outputted from the electric booster 11 and generate the liquid pressure when the driver operates the brake pedal 2, and the pedal simulator 12 configured to provide the pedal feel according to the driver's pedaling force by the liquid pressure generated in the master cylinder 4.

In addition, the brake device according to an embodiment of the present disclosure may further include the wheel brakes 28 provided on the wheels FL, FR and RL, RR, respectively, the liquid pressure supply device 20 configured to generate the brake liquid pressure (braking hydraulic pressure), the hydraulic lines 6, 8, 8a, 23, 24 connecting the components including the reservoir 1, the master cylinder 4, the pedal simulator 12, the liquid pressure supply device 20, the wheel brakes 28 and the like, and the valves 7, 9, 25, 26 and 27 provided on the hydraulic lines.

The pedal simulator 12 is connected to the master cylinder 4 through a backup line 8a to receive the liquid pressure generated in the master cylinder 4.

Further, the brake device according to an embodiment of the present disclosure may have a configuration for forming and controlling the hydraulic pressure using an electronic actuator, and such the brake device is usually called an electro-hydraulic brake system (EHB), that is, an electronic hydraulic brake device.

FIG. 2 shows the configuration of the electronic hydraulic brake device, this electronic hydraulic brake device is merely exemplary, and the present disclosure is not limited thereto. The present disclosure is not limited to the electronic actuator. In addition, the present disclosure may have a configuration of a general hydraulic brake device in which the brake liquid pressure is generated and supplied by a conventional pump, instead of the electronic actuator.

As illustrated, the electronic hydraulic brake device employs an electronic hydraulic actuator as the liquid pressure supply device 20 generating and supplying the brake liquid pressure (braking hydraulic pressure).

The electronic hydraulic brake device which is the liquid pressure supply device 20 may have a configuration in which rotational force generated in and supplied by the motor M is converted into linear force through the power conversion part T to move the piston 22 forward and backward and, at this time, the piston 22 which is controlled to be moved forward and backward pressurizes brake liquid in a chamber of the cylinder 21 to generate and control the hydraulic pressure.

That is, when the driver operates the brake pedal 2, a pedal-operational value is sensed by the brake pedal sensor (PTS) 3, and when a controller (the reference numeral 10 in FIG. 3) controls the motor M of the actuator (the liquid pressure supply device) 20 according to the sensed pedal-operational value, the rotational force of the motor M is converted into the linear force by the power conversion part T to move the piston 22 forward and backward, whereby a regulated hydraulic pressure is generated in the cylinder 21. The controller 10 may be an electric circuitry that executes instructions of software which thereby performs various functions described hereinafter.

The above-described electronic actuator is a known structure which has been already used in the electronic hydraulic brake device, and thus an additional description thereof is omitted.

In the brake device according to an embodiment of the present disclosure, the wheel brake 28 is a component configured to generate a braking force for restricting rotation of the relevant wheel using the brake liquid pressure (braking hydraulic pressure) which is generated in the liquid pressure supply device 20 and transmitted thereto, and the liquid pressure supply device 20 is connected to the wheel brake via the hydraulic lines 23 and 24.

In the brake device according to an embodiment of the present disclosure, the hydraulic lines include hydraulic pressure supply lines 23 and 24 connecting the wheel brake 28 of each wheel and the liquid pressure supply device 20 and to supply the brake liquid pressure (braking hydraulic pressure), which is generated by the liquid pressure supply device 20, to each wheel brake 28 and backup lines 6 and 8 connected from the master cylinder 4 to the hydraulic pressure supply lines 23 and 24.

The hydraulic pressure supply lines include a first hydraulic pressure supply line 23 connected from the liquid pressure supply device 20 (electronic hydraulic actuator) to the two wheel brakes 28 of the front wheels FL and FR and a second hydraulic pressure supply line 24 connected from the liquid pressure supply device 20 to the two wheel brakes 28 of the rear wheels RL and RR.

The valves 25 configured to control a flow of brake liquid are provided on the hydraulic pressure supply lines 23 and 24 between the liquid pressure supply device 20 and the wheel brake 28.

In addition, each of the hydraulic pressure supply lines 23 and 24 is connected to the wheel brake 28 of each of the wheels FL, FR and RL, RR via an inlet valve 26, and an outlet valve 27 is provided on a return line branched from the hydraulic pressure supply lines 23 and 24 connected to the wheel brake of each wheel.

Furthermore, the backup lines include a first backup line 6 connected from a first hydraulic port 5a of the master cylinder 4 to the first hydraulic pressure supply line 23 and a second backup line 8 connected from a second hydraulic port 5b of the master cylinder 4 to the second the hydraulic pressure supply line 24.

Also, a first cut valve 7 is provided on the first backup line 6, a second cut valve 9 is provided on the second backup line 8, and all the first cut valve 7 and the second cut valve 9 are provided as normal open type valves.

In the above described configuration, the first backup line 6 and the second backup line 8 become a portion of the hydraulic line between the master cylinder 4 and the wheel brake 28. In the know brake device, when the brake device enters the backup mode due to its malfunction, the first cut valve 7 and the second cut valve 9 become in closed state (a state in which a current is shut off), so that the first backup line 6 and the second backup line 8 function to transmit the liquid pressure generated in the master cylinder 4 to the wheel brake 28 of each of the wheels FL, FR and RL, RR.

On the contrary, in a normal mode, the first cut valve 7 and the second cut valve 9 become in closed state (a state in which a current is applied) and, at this time, the liquid pressure generated in the master cylinder 4 is not transmitted to the wheel brake 28 of each of the wheels FL, FR and RL, RR.

The first cut valve 7 and the second cut valve 9 serve to hydraulically disconnect the master cylinder 4, the pedal simulator 12 and the brake pedal 2 from the liquid pressure supply device 20, the hydraulic pressure supply lines 23 and 24 and the wheel brake 28, and in a state in which the first cut valve 7 and the second cut valve 9 are closed, the liquid pressure formed and controlled by the liquid pressure supply device 20 is transmitted to the wheel brake 28 of each of the wheels FL, FR and RL, RR to generate the braking force.

The pedal simulator 12 is provided to provide a reaction force in response to the pedaling force of the brake pedal 2, and may be connected to the second backup valve 9 between the master cylinder 4 and the second cut valve 9 via the separate hydraulic line 8a.

The above-described pedal simulator has a structure known in the brake device, and thus an additional description thereof is omitted.

Meanwhile, the brake device according to an embodiment of the present disclosure includes a fallback valve 29 which can selectively shut off the liquid pressure to the rear wheel.

The fallback valve 29 is a component newly added to the present disclosure, and is the electronic valve that is installed on the second hydraulic pressure supply line 24 connected to the wheel brakes 28 (calipers) of both the rear wheels RL and RR and is controlled by a controller 10 to be opened and closed.

More specifically, the fallback valve 29 is installed one the second hydraulic pressure supply line 24 connected from the liquid pressure supply device 20 to the two wheel brakes 28 on both the rear wheels RL and RR, and is installed downstream of a point of the second hydraulic pressure supply line 24, where the first backup line 8 is connected.

In addition, unlike the first cut valve 7 and the second cut valve 9, the fallback valve 29 is the normal closed (NC) type valve, when a current is applied by the controller 10, the fallback valve is opened, and in a state in which a current is not applied and shut off, the fallback valve is always maintained in closed state.

The present disclosure is configured such that, under a situation in which the electric booster 11 is in the backup mode, when all the first cut valve 7 and the second cut valve 9, which are the normal open type valves, are in opened state, a current is shut off and the fallback valve 29 is closed by the controller 10.

Due to the above, the second hydraulic pressure supply line 24 becomes in a state in which a flow passage thereof is blocked by the fallback valve 29, so that the wheel brakes 28 (calipers) of both the rear wheels RL and RR become in a state in which the brake liquid pressure cannot be supplied thereto.

Since the second hydraulic pressure supply line 24 is blocked by the fallback valve 29 when the brake device enters the backup mode, even though the driver operates the brake pedal 2, the brake liquid pressure (hydraulic pressure of the master cylinder) caused by the pedaling force is not transmitted to the rear wheel brakes 28 of both the rear wheels RL and RR.

Eventually, in a state in which both the first cut valve 7 and the second cut valve 9 are opened after the brake device enters the backup mode, the brake liquid pressure caused by the pedaling force of the brake pedal is transmitted to the piston in the cylinder of the caliper in the wheel brakes 28 of the front wheels FL and FR through the first backup line 6 and the first hydraulic pressure supply line 23 to generate a braking force.

On the other hand, in the wheel brakes 28 of the rear wheels RL and RR, in a state in which the brake liquid pressure caused by the pedaling force of the brake pedal is not transmitted to the piston in the cylinder of the caliper, control of forward and backward movements of the piston caused by an electronic parking brake (EPB) actuator can be smoothly performed.

Therefore, EPB cooperative control (dynamic parking brake control) can be normally performed by the controller 10 to enhance a braking deceleration of the vehicle, an accurate braking control for the rear wheels is also possible by the dynamic parking braking using the normal EPB cooperative control, and by generating the required braking force on the rear wheels by means of the dynamic parking braking, it is possible to assist the braking deceleration of the vehicle.

In the normal mode, of course, since a current is applied to the fallback valve 29 so that the fallback valve is always maintained in opened state, when the driver operates the brake pedal 2, the brake liquid pressure generated by the liquid pressure supply device 20 can be normally supplied to the wheel brakes 28 of both the rear wheels RL and RR through the second hydraulic pressure supply line 24, and normal rear wheel braking can be performed.

A method for controlling the brake device is described with reference to FIG. 4. When diagnosis for the brake device including the electric booster 11 is made by the controller 10 and the brake pedal is operated by the driver, the controller 10 receives a signal from the pedal sensor 3 indicating that the brake pedal 2 is operated.

Then, when the brake pedal is operated (S11), if it is diagnosed that an abnormality or malfunction of the electric booster 11, an abnormality or malfunction of the brake device occurs, the brake device enters the backup mode (S12, S18).

The above described diagnosis process has been already performed in the known brake device, and thus a detailed description thereof will be omitted.

When the brake device enters the backup mode, the controller 10 shuts off the current of the fallback valve 29 to allow the fallback to become in closed state (S19). Therefore, the wheel brakes 28 of both the rear wheels RL and RR become in a state in which the brake liquid pressure (hydraulic pressure of the master cylinder) caused by the pedaling force of the brake pedal is not transmitted thereto through the hydraulic lines 8 and 24, but is shut off.

Further, then the brake device enters the backup mode, the EPB cooperative control for the dynamic parking braking to the rear wheels RL and RR can be normally performed by the controller 10 (S21), and thus the normal braking control generating the required braking force can be performed for the rear wheels RL and RR.

Of course, since the brake liquid pressure caused by the pedaling force of the brake pedal is transmitted to the wheel brake 28 on both the front wheels FL and FR through the hydraulic lines 6 and 23, it is also possible to generate the required braking force for the front wheels.

Meanwhile, when it is determined in the step S12 that the brake device including the electric booster 11 is in a normal state, a state in which a current is applied to the fallback valve 29, the first cut valve 7 and the second cut valve 9 is maintained by the controller 10, and thus the fallback valve 29 which is the normal closed type valve is opened (S13), while the first cut valve 7 and the second cut valve 9, which are the normal open type valves, are closed (S14).

Subsequently, the liquid pressure is generated by operation of the liquid pressure supply device 20 and is transmitted to the wheel brake 28 of each of the front wheels FL and FR and the rear wheels RL and RR (S15, S16 and S17), and the braking in the normal mode is performed for the front wheels and the rear wheels.

Conventionally, in a vehicle equipped with an integrated electric booster which is an electronic system, when a system malfunction occurs, a driver could instantaneously feel braking inconvenience (stiffness of the brake pedal), causing a crash accident. In the brake device according to the present disclosure as described above, however, since the improved hydraulic circuit capable of shutting off the brake liquid pressure caused by the pedaling force of the brake pedal to the wheel brakes of both the rear wheels is applied, the EPB cooperative control for the dynamic parking braking can be stably performed, and there is an advantage in that a braking system becomes robust and field claim is prevented in advance.

As described above, according to the brake device and the method for controlling the same in accordance with the present disclosure, since the EPB cooperative control process such as the dynamic parking braking can be stably performed in a state in which the brake device enters the backup mode of the integrated electric booster, it is possible to avoid collision and accident occurrence due to insufficient braking deceleration of the vehicle in the backup mode, and to improve braking performance and running stability of the vehicle.

Further, according to the brake device and the method for controlling the same according to the present disclosure, through a simple improvement such as adding the valve, which interrupts the circuit in the backup mode, in the hydraulic circuit of the brake device using the integrated electric booster (IEB), accordingly, the braking deceleration of the vehicle in the backup can be enhance and stability can be secured.

While the present disclosure has been described in detail with reference to exemplary embodiments thereof, the scope of the present disclosure is not limited to the above embodiments, and various modifications and improved forms which is made by those skilled in the art using the basic concept of the present disclosure as defined in the appended claims are also included in the scope of the present disclosure.

What is claimes is:

1. A method for controlling a brake device for a vehicle provided with an electric booster and an electronic parking brake, the brake device comprising a master cylinder configured to receive pedaling force outputted from the electric booster and generate a brake liquid pressure; a liquid pressure supply device configured to generate the brake liquid pressure according to a driver's pedal-operational value detected by a brake pedal sensor and supply the brake liquid pressure to a wheel brake of each wheel; a hydraulic pressure supply line connected from the liquid pressure supply device to the wheel brake of each wheel to enable the brake liquid pressure to be supplied from the liquid pressure supply device to the wheel brake; a backup line connected from the master cylinder to the hydraulic pressure supply line to enable the brake liquid pressure to be supplied from the master cylinder to the hydraulic pressure supply line; a cut valve disposed on the backup line and configured to selectively shut off the brake liquid pressure; and a fallback valve disposed on the hydraulic pressure supply line connected to the wheel brake of the wheel on which the electronic parking brake is installed, the fallback valve being configured to selectively shut off the brake liquid pressure supplied to the wheel brake, the method comprising:

diagnosing a state of the brake device including the electric booster by a controller, and allowing the brake device to enter a backup mode by the controller in a case where the brake device is in a malfunction state when a driver operates a brake pedal;

generating the brake liquid pressure in the master cylinder according to the pedaling force as a driver operates a brake pedal;

in the backup mode, controlling, by the controller, the fallback valve disposed on the hydraulic pressure supply line to become in a closed state in a state in which the cut valve disposed on the backup line is opened; and performing, by the controller, dynamic parking brake control in which braking force for vehicle deceleration is generated by using the electronic parking brake.

2. The method for controlling the brake device of claim 1, wherein the wheel on which the electronic parking brake is installed is a rear wheel, and the hydraulic pressure supply line on which the fallback valve is disposed is connected from the liquid pressure supply line to the wheel brake of the rear wheel for supplying the brake liquid pressure from the liquid pressure supply line to the wheel brake of the rear wheel.

3. The method for controlling the brake device of claim 2, wherein, after the controller enters the backup mode, in the state in which the cut valve is opened, the braking force is generated in the rear wheel by the electronic parking brake and simultaneously the brake liquid pressure generated in the master cylinder is transmitted to the wheel brake of the front wheel to generate the braking force in the front wheel.

4. The method for controlling the brake device of claim 1, wherein the fallback valve is a normal closed type valve that is opened when a current is applied thereto and is closed when the current is shut off.

5. The method for controlling the brake device of claim 1, wherein the fallback valve is installed at a downstream point of the hydraulic pressure supply line with respect to a point where the backup line is connected to the hydraulic pressure supply line.

6. The method for controlling the brake device of claim 1, wherein the cut valve is a normal open type valve that is closed when a current is applied thereto and is opened when the current is shut off.

7. A method for controlling a brake device for a vehicle provided with an electric booster and an electronic parking brake installed on a rear wheel, the brake device being including a fallback valve installed on a hydraulic line between a master cylinder and a wheel brake of the rear wheel in addition to a cut valve, the method comprising:

diagnosing a state of the brake device including the electric booster by a controller, and allowing the brake device to enter a backup mode by the controller in a case where the brake device is in a malfunction state when a driver operates a brake pedal;

generating the brake liquid pressure in the master cylinder according to the pedaling force as a driver operates a brake pedal;

controlling, by the controller, the fallback valve in the backup mode to become in a closed state; and performing, by the controller, dynamic parking brake control in which braking force for vehicle deceleration is generated by using the electronic parking brake, wherein, after the controller enters the backup mode, in a state in which the cut valve provided on the hydraulic line between the master cylinder and a wheel brake of a front wheel is opened, the braking force is generated in the rear wheel by the electronic parking brake while the fallback valve in the backup mode is in the closed state and simultaneously the brake liquid pressure generated in the master cylinder is transmitted to the wheel brake of the front wheel to generate the braking force in the front wheel.

8. The method for controlling the brake device of claim 7, wherein the fallback valve is a normal closed type valve that is opened when a current is applied thereto and is closed when the current is shut off.

9. The method for controlling the brake device of claim 7, wherein the cut valve is a normal open type valve that is closed when a current is applied thereto and is opened when the current is shut off.

10. A method for controlling a brake device for a vehicle provided with an electric booster and an electronic parking brake, the brake device comprising: a master cylinder configured to receive pedaling force outputted from the electric booster and generate a brake liquid pressure; a liquid pressure supply device configured to generate the brake liquid pressure according to a driver's pedal-operational value detected by a brake pedal sensor and supply the brake liquid pressure to a wheel brake of each wheel; a hydraulic pressure supply line connected from the liquid pressure supply device to the wheel brake of each wheel to enable the brake liquid pressure to be supplied from the liquid pressure supply device to the wheel brake; a backup line connected from the master cylinder to the hydraulic pressure supply line to enable the brake liquid pressure to be supplied from the master cylinder to the hydraulic pressure supply line; a cut valve disposed on the backup line and configured to selectively shut off the brake liquid pressure; and a fallback valve disposed on the hydraulic pressure supply line connected to the wheel brake of the wheel on which the electronic parking brake is installed, the fallback valve being configured to selectively shut off the brake liquid pressure supplied to the wheel brake, the hydraulic pressure supply lines including a first hydraulic pressure supply line connected from the liquid pressure supply device to the two wheel brakes of the front wheels and a second hydraulic pressure supply line connected from the liquid pressure supply device to the two wheel brakes of the rear wheels, the backup lines including a first backup line connected from a first hydraulic port of the master cylinder to the first hydraulic pressure supply line and a second backup line connected from a second hydraulic port of the master cylinder to the second the hydraulic pressure supply line, the method comprising:

diagnosing a state of the brake device including the electric booster by a controller, and allowing the brake device to enter a backup mode by the controller in a case where the brake device is in a malfunction state when a driver operates a brake pedal;

generating the brake liquid pressure in the master cylinder according to the pedaling force as a driver operates a brake pedal;

in the backup mode, controlling, by the controller, the fallback valve disposed on second hydraulic pressure supply line to become in a closed state in a state in which the cut valve disposed on the backup line is opened; and performing, by the controller, dynamic parking brake control in which braking force for vehicle deceleration is generated by using the electronic parking brake.

* * * * *